May 11, 1937.   C. D. PETERSON   2,080,091
HELICAL SLIDING GEAR TRANSMISSION
Filed Feb. 21, 1936   2 Sheets—Sheet 1
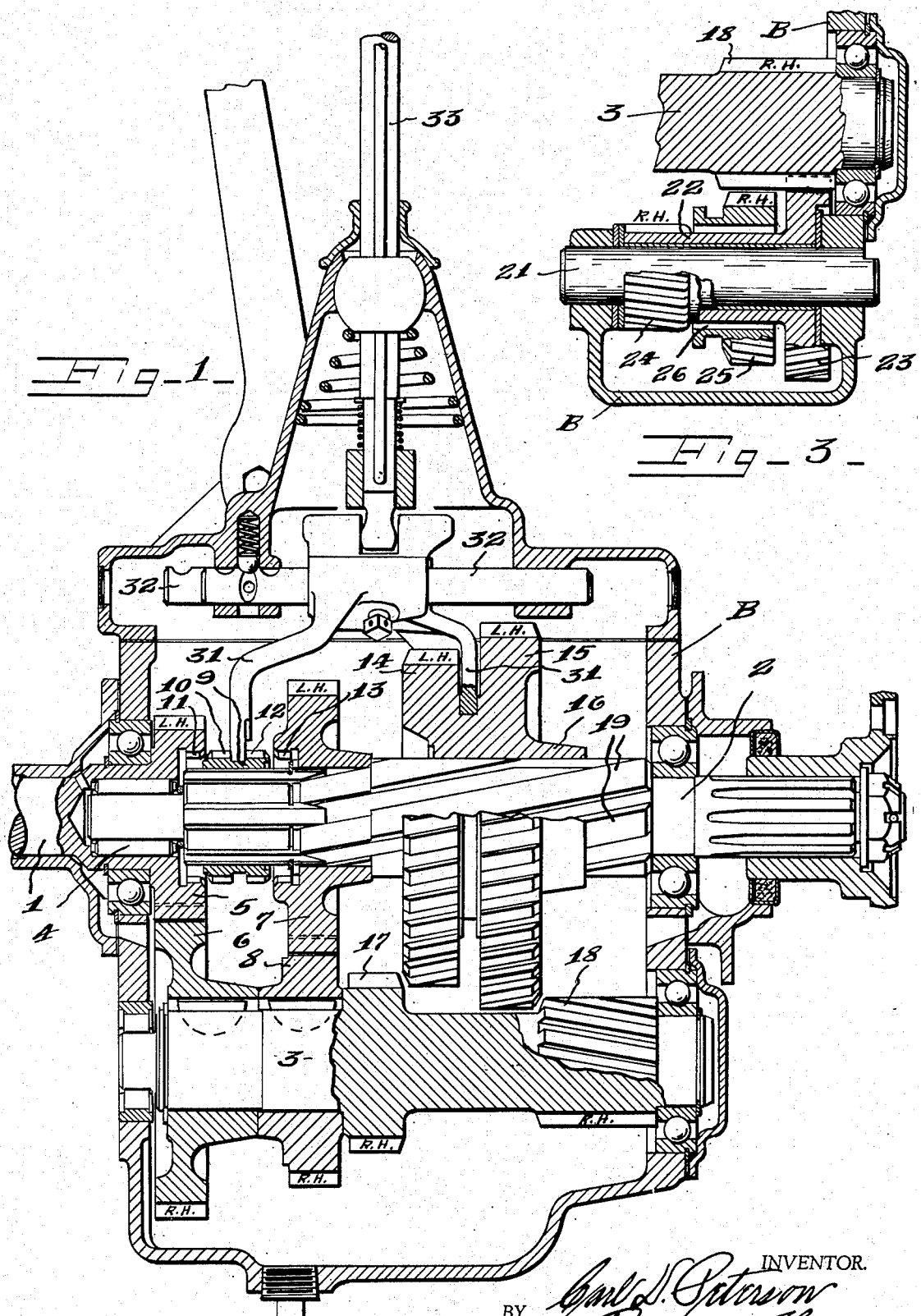
INVENTOR.
Carl D. Peterson
BY
Bodell & Thompson
ATTORNEYS.

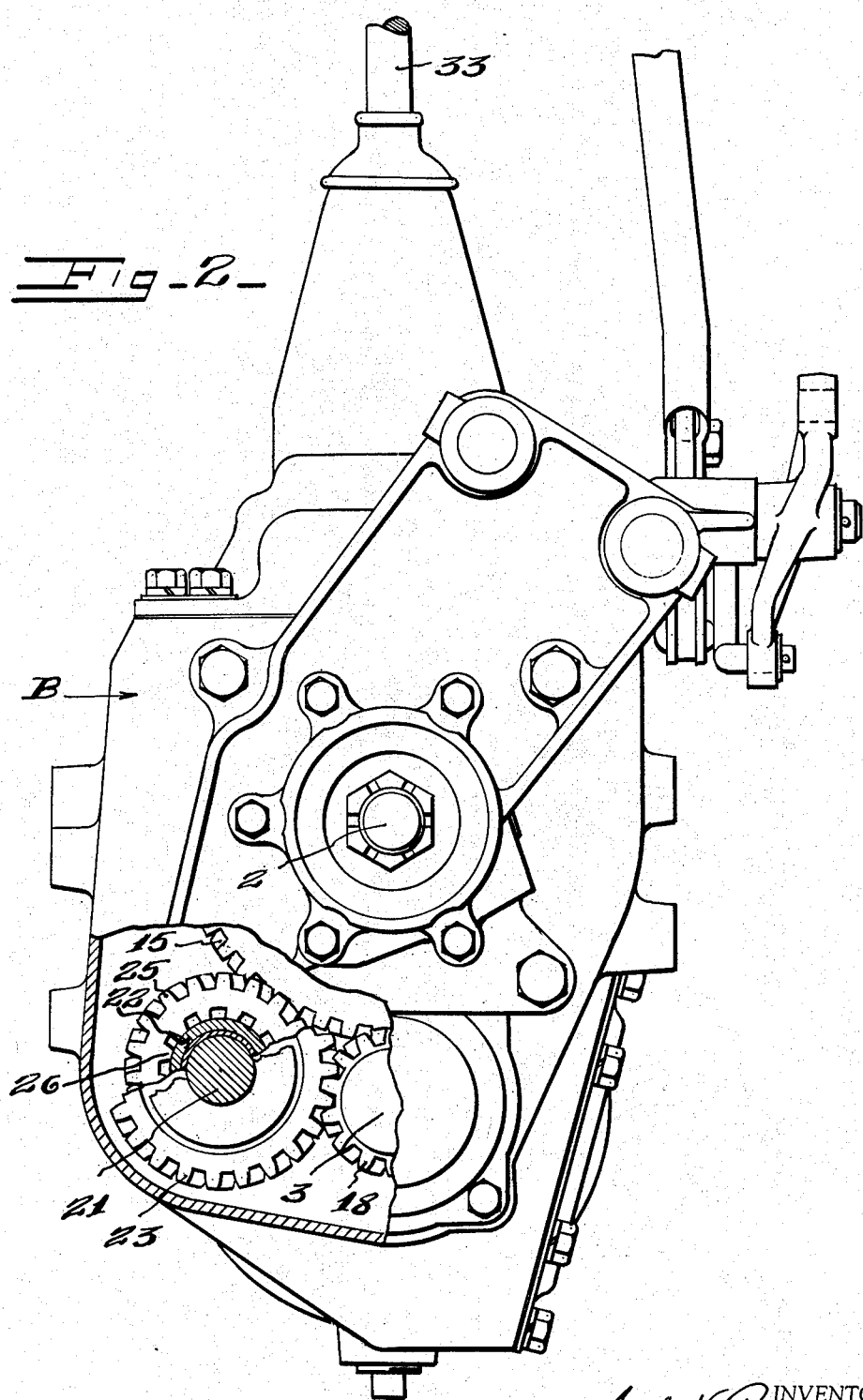

Patented May 11, 1937

2,080,091

UNITED STATES PATENT OFFICE 2,080,091

HELICAL SLIDING GEAR TRANSMISSION

Carl D. Peterson, Toledo, Ohio

Application February 21, 1936, Serial No. 65,099

5 Claims. (Cl. 74—343)

This invention relates to transmission gearings, and particularly to transmission gearings in which sliding helical gears are employed to produce some of the gear changes, particularly where a double helical gear on the transmission shaft is shifted in opposite directions from neutral to produce two different speeds, as first and second speed forward, and has for its object a construction or mounting of the shiftable helical gears by which the thrust of the gear, when in mesh with a companion helical gear is counteracted, opposed or balanced by the mounting of the shiftable gear, so that locks or additional opposing forces other than those inherent in the mounting and the helical gear teeth are not necessary to hold the helical gears in mesh under load.

It further has for its object a helical gear transmission in which the shiftable reverse helical pinion is shifted into mesh with one of the helical gears of the double gear on the transmission shaft, when the latter gear is in neutral position with the gears having built inherently into their mountings, means for counteracting, opposing or balancing the thrust tending to move the reverse gear out of mesh, and also tending to shift the double helical gear, on the transmission shaft, with which the reverse pinion meshes from movement out of neutral, when the reverse pinion is in mesh therewith.

More specifically, it has for its object a mounting for the shiftable double helical gear of a transmission in which the double gear is mounted upon its shaft by means of splines having the same lead and direction of spiral as the helices of the gear teeth, so that when the double gear is shifted from neutral in either direction, the thrust of the helical gears is opposed or neutralized by the splines, and hence, the double gear held in either of its shifted positions without additional holding means, and also a mounting for the helical reverse pinion on its shaft by means of splines having the same lead and direction of spiral, as the teeth of the pinion, particularly where the reverse pinion is shifted into mesh with one of the double gears, so splined with helical splines on the transmission shaft, when the double gear is in neutral position, so that owing to the mountings not only is the shiftable double gear held in either of its shifted positions out of neutral without additional holding means but also are held in neutral against thrust tending to shift them out of neutral, when the reverse pinion is shifted into mesh with one of the gears of the double gear, and also the reverse pinion held in shifted position.

The invention consists in the novel features and in the combinations and constructions hereinafter set forth and claimed.

In describing this invention, reference is had to the accompanying drawings in which like characters designate corresponding parts in all the views.

Figure 1 is a vertical sectional view through a four speed forward and reverse transmission gearing embodying this invention.

Figure 2 is an end view, partly broken away, of parts seen in Figure 1.

Figure 3 is a detail view of the reverse gearing.

I have here illustrated the invention as embodied in a transmission gearing with four speeds forward and one reverse, all the shiftable gears being slidable helical gears shiftable to effect first and second speeds and with a reverse gear helical pinion shiftable to produce reverse speed.

In the illustrated embodiment of the invention, the shiftable reverse helical pinion is shifted into mesh with one of the shiftable helical gears when in neutral position and which, when shifted, produces first speed forward, the reverse pinion being shiftable into mesh therewith only when the first speed forward gear is in neutral position.

The invention consists in the construction of the mounting for the shiftable helical gears so that the torque load exerts a force opposing the thrust of the helical intermeshing gears so that the shiftable helical gear in mesh with its companion gear is held in shifted position or from shifting, and also a mounting for the shiftable reverse gear, whereby a force is exerted holding it from shifting in a retrograde direction when shifted into mesh with a companion gear in a reverse gear train, and further a mounting construction for effecting this result when one of the forward speed gears, as the shiftable first speed forward gear, is utilized in the reverse gear train, all whereby the shiftable helical gears are held from shifting by constructions inherent in the mountings of the gears on the shafts on which they are slidable, so that any additional holding means or force is not required to hold the shiftable gears in shifted position or holding them from shifting, when connected in a gear train.

In the drawings, 1 is the drive shaft of a change speed gearing; 2 the driven or transmission shaft; and 3 the counter shaft, these being suitably mounted within a gear box B with the drive and transmission shafts mounted in axial alinement and the transmission shaft having a pilot bearing at 4 in the drive shaft 1.

5 and 6 are helical gears on the drive and counter shafts respectively, these being constantly in mesh, the gear 5 being formed integral with the drive shaft 1.

7 and 8 are a pair of permanently meshing helical gears mounted respectively on the transmission shaft and the counted shaft, the gear 7 being rotatably mounted on the transmission shaft and the gear 8 keyed to the counter shaft.

9 is a double clutch section splined or keyed to the transmission shaft 2 and shiftable in one direction, as to the left from neutral, to engage the clutch face 10 thereof with internal clutch teeth 11 of the gear 5 and lock the drive shaft 1 and transmission shaft 2 together in direct drive relation. The clutch section 9 is also shiftable in the opposite direction from neutral, or to the right (Figure 1), to engage the clutch face 12 thereof with internal clutch teeth 13 on the gear 7, to lock the gear 7 to the transmission shaft 2 and connect the drive shaft with the transmission shaft in a direct drive relation or third speed forward, the drive taking place through the gears 5, 6, 8, 7 and clutch section 9.

14 and 15 constitute a double gear having a common hub 16 on the transmission shaft 2, this unitary double gear 14 and 15 being slidable in opposite directions from neutral, the gear 14 being shiftable from neutral to the left (Figure 1) into mesh with the gear 17 on the counter shaft and the gear 15 being shiftable to the right from neutral into mesh with the gear 18 on the counter shaft. The gears 14, 15, 17 and 18 have helical teeth. The helices of the gears 14 and 15 are left hand and those of the gears 17 and 18 right hand, and on the drawings, LH designate left hand helix and RH, right hand. When the gear 14 is shifted to the left to mesh with the gear 17, the thrust due to the helical teeth tends to force the gear 14 to the right out of mesh with the gear 17. When the gear 15 is shifted into mesh with the gear 18, the thrust due to the helical teeth tends to thrust the gear 15 further to the right.

The mounting construction of the double gear 14, 15 on the transmission shaft 2, whereby the thrust of the gear 14 or 15 is neutralized when the gear 14 is in mesh with the gear 17 or the gear 15 in mesh with the gear 18, comprises helical splines 19 formed on the transmission shaft and interfitting with complemental splines in the hub 16. The splines 19 have the same lead and direction of spiral as the helices of the teeth of the gears 14, 15. Hence, when the first speed gear 15 on the transmission shaft 2 is slid into driving contact with the helical gear 18, the helical gear will be balanced against sliding movement by the reacting thrust of the load on the helical splines 19 of the transmission shaft 2, and likewise, when the second speed forward gear 14 is slid into mesh with the helical gear 17 on the counter shaft, the thrust of gear 14 to the right will be balanced by the reacting of the load of the helical splines 19 on the complemental splines of the hub 16, so that the gears 14, 15 are held in their shifted position, without additional holding means or additional external forces.

The transmission shaft and the counter shaft are parallel shafts on one of which is mounted a double helical gear shiftable in opposite directions from neutral into mesh respectively with the companion helical gear on the other shaft.

21 is a shaft or stud suitably mounted in the gear box, on which the reverse gear shaft is mounted, this being a hollow shaft 22 and here shown as an integral extension of the hub of a spiral gear 23 meshing with the spiral gear 18 or an extension thereof. The reverse shaft is formed with helical splines 24.

25 is a shiftable helical reverse pinion on the reverse shaft 22 and shiftable from starting position to the left into mesh with the first speed forward gear 15 on the transmission shaft 2 when the gear 15 is in neutral position, the lead and direction of the splines 24 being the same as that of the teeth of the gear 25, that is, a right hand helix. The gear 25 is provided with internal splines 26. The root diameter of the splines 24 is the same as the diameter of the portion of the reverse shaft supporting the reverse pinion 25. When in normal position, the edges of the internal splines 26 of the pinion 25 bear on said portion. Hence, as the gear 15 when shifted into mesh with the gear 18 on the counter shaft also meshes with the reverse pinion, the reverse pinion merely idles about the reverse shaft. Upon shifting of the reverse pinion 25 to the left (Figure 1), it is brought into mesh with the gear 15 on the transmission shaft 2 and its splines are brought into mesh with the splines 24, so that the power is transmitted from the drive shaft 1 through gears 5, 6, counter shaft 3, gear 18 on the counter shaft, gear 22, pinion 25 and gear 15. The helix of the spline 19 on the transmission shaft 2 is a left hand one. The spline 24 is a right hand one. When the reverse pinion 25 is brought into mesh with the gear 15, the torque load on the shaft 2 tends to shift the gear 15 in one direction or to the left (Figure 1).

When the reverse gear pinion 25 is shifted into mesh with the gear 15 on the transmission shaft, it tends to shift the gear 15 to the left (Figure 1) and this shifting is counteracted by the splines 19, bearing in mind that now the transmission shaft 2 is being driven in a reverse direction or anticlockwise, when viewed from the left (Figure 1) and the right hand splines 24 of the reverse shaft 22 counteract the tendency of the reverse gear 25 to shift to the right (Figure 1) out of mesh with the gear 15.

Hence, owing to the arrangement of splines 19 relatively to the teeth of the gears 14, 15, the unitary gear 14, 15 is held in either of its shifted positions without additional holding means; or the thrust of the gear 14, when in mesh with the gear 17, is neutralized by the splines 19 and also the tendency of the gear 14, 15 to shift back to neutral, when the gear 15 is in mesh with the gear 18 on the counter shaft is neutralized. In other words, owing to the splines 19, the tendency of the unitary gear 14, 15 to shift either toward the left or toward the right into neutral position is counteracted without additional holding means.

Also, owing to the splines 19 and the splines 24, on the reverse shaft, the unitary gear 14, 15 is held in neutral position when the reverse pinion 25 is shifted into mesh with the gear 15, or the tendency of said unitary gear 14, 15 to shift out of neutral position is counteracted by the arrangement of splines 19 and 24. Also, the tendency of the reverse pinion 25 to shift out of shifted position is opposed and counteracted by the splines 24, without additional holding means.

The clutch section 9, unitary gear 14, 15 and reverse pinion 25 are shifted by suitable gear shifting mechanism, as forks, as 31 on suitable shift rods, as 32, which are operated by the usual selecting and gear shifting lever as 33.

What I claim is:—

1. A transmission gearing including drive, transmission and counter shafts, and gearing between them, and a reverse shaft, gearing between the counter shaft and the transmission shaft, gearing between the reverse shaft and the counter shaft and helical gearing between the reverse shaft and the transmission shaft including a shiftable spiral gear on the transmission shaft and a shiftable spiral pinion on the reverse shaft to normally rotate idly therewith and shiftable into mesh with the former spiral gear, the reverse pinion having internal splines and the reverse shaft having external splines for coacting with the splines of the reverse pinion when said pinion is shifted into mesh with its companion gear on the transmission shaft, the direction of the spiral of the splines of the reverse shaft being the same as that of the teeth of the reverse pinion.

2. A transmission gearing including drive, transmission and counter shafts, and gearing between them, and a reverse shaft, the gearing between the counter shaft and the transmission shaft including helical gears shiftable, as a unit, on the transmission shaft in opposite directions from neutral into mesh with companion helical gears on the counter shaft, the unitary shiftable gear being mounted on the counter shaft by splines having the same lead and direction of spiral as the teeth of the gear of the unitary gear, gearing between the counter shaft and the reverse shaft, a reverse helical pinion shiftable axially of the reverse shaft into and out of mesh with one of the gears of the unitary shiftable gear when the latter is in neutral position, the reverse pinion being shiftable into engagement with splines on the reverse shaft having the same lead and direction of spiral as the teeth of the reverse pinion.

3. A transmission gearing including drive, transmission and counter shafts, and gearing between them, and a reverse shaft, the gearing between the counter shaft and the transmission shaft including helical gears shiftable, as a unit, on the transmission shaft in opposite directions from neutral into mesh with companion helical gears on the counter shaft, the unitary shiftable gear being mounted on the counter shaft by splines having the same lead and direction of spiral as the teeth of the gear of the unitary gear, gearing between the counter shaft and the reverse shaft, a reverse helical pinion shiftable axially of the reverse shaft into and out of mesh with one of the gears of the unitary shiftable gear when the latter is in neutral position, the reverse pinion having internal splines and being mounted to rotate idly on the reverse shaft and being shiftable into engagement with splines on the reverse shaft having the same direction of spiral as the teeth of the reverse pinion.

4. A transmission gearing including drive, transmission and counter shafts, and gearing between them, and a reverse shaft, gearing between the reverse shaft and the counter shaft and between the reverse shaft and the transmission shaft, the gearing between the counter shaft and the transmission shaft including a pair of helical gears shiftable, as a unit, on the transmission shaft in opposite directions from neutral into mesh respectively with gears on the counter shaft, the unitary shiftable gear being mounted on the transmission shaft by splines having the same direction of spiral as the teeth of the gears of the unitary gear, the gearing between the reverse shaft and the transmission shaft including a shiftable spiral pinion shiftable into and out of mesh with one of the gears on the transmission shaft, the reverse pinion, when in shifted position, being connected to the reverse shaft by splines having the same direction of spiral as the teeth of the reverse pinion.

5. A transmission gearing including driving and transmission shafts arranged in axial alinement, a counter shaft, gearing between the driving and counter shafts, and gearing between the counter shaft and the transmission shaft, the latter being helical gears, and the gears on the transmission shaft being splined on the transmission shaft and being shiftable axially into and out of mesh with gears on the counter shaft, the splines on the transmission shaft having the same direction of spiral as the teeth of the helical gears, a reverse shaft, a helical gear thereon meshing with a gear on the counter shaft, a shiftable helical reverse pinion slidable on the reverse shaft, the shiftable reverse pinion being shiftable into and out of mesh with a helical gear on the transmission shaft, the pinion being mounted to normally rotate idly on the reverse shaft and having internal splines, and the reverse shaft having splines arranged to interlock with the internal splines, when the reverse pinion is shifted, the direction of spiral of the splines between the reverse pinion and the reverse shaft being the same as that of the helical teeth of the reverse pinion, whereby the shiftable reverse pinion and the shiftable gears on the transmission shaft are automatically held in shifted position against the thrust tending to shift them out of shifted position.

CARL D. PETERSON.